US008526446B2

(12) United States Patent
Lawrence et al.

(10) Patent No.: US 8,526,446 B2
(45) Date of Patent: Sep. 3, 2013

(54) ETHERNET-BASED SYSTEMS AND METHODS FOR IMPROVED NETWORK ROUTING

(75) Inventors: Joseph Lawrence, Boulder, CO (US); Nassar El-Aawar, Denver, CO (US); Darren Loher, Arvada, CO (US); Steven Craig White, Longmont, CO (US); Raoul Alcala, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1170 days.

(21) Appl. No.: 11/347,810

(22) Filed: Feb. 3, 2006

(65) Prior Publication Data
US 2006/0215672 A1 Sep. 28, 2006

Related U.S. Application Data

(60) Provisional application No. 60/650,312, filed on Feb. 4, 2005.

(51) Int. Cl.
*H04L 12/28* (2006.01)
*G01R 31/08* (2006.01)

(52) U.S. Cl.
USPC ............ 370/401; 370/230; 370/235; 370/254

(58) Field of Classification Search
USPC ........................................................ 370/401
See application file for complete search history.

(56) References Cited

U.S. PATENT DOCUMENTS

| 4,639,881 | A |   | 1/1987  | Zingher |
|-----------|---|---|---------|---------|
| 4,998,242 | A |   | 3/1991  | Upp |
| 5,068,916 | A |   | 11/1991 | Harrison |
| 5,119,370 | A |   | 6/1992  | Terry |
| 5,276,445 | A |   | 1/1994  | Mita |
| 5,467,347 | A | * | 11/1995 | Petersen ........................ 370/230 |
| 5,541,914 | A | * | 7/1996  | Krishnamoorthy et al. .. 370/427 |
| 5,845,215 | A |   | 12/1998 | Henry |
| 5,999,103 | A |   | 12/1999 | Croslin |
| 6,016,307 | A |   | 1/2000  | Kaplan |
| 6,151,324 | A | * | 11/2000 | Belser et al. ................... 370/397 |
| 6,335,992 | B1 |  | 1/2002  | Bala et al. |
| 6,574,335 | B1 |  | 6/2003  | Kalmanek, Jr. et al. |

(Continued)

FOREIGN PATENT DOCUMENTS

| JP | 2000-165412 A | 6/2000 |
|----|---------------|--------|
| JP | 2004/507136   | 3/2004 |

(Continued)

OTHER PUBLICATIONS

International Searching Authority, U.S. Patent and Trademark Office and Receiving Office, International Search Report (Form PCT/ISA/210) for international application No. PCT/US07/61629, Feb. 26, 2008, 4 pages.

(Continued)

*Primary Examiner* — Faruk Hamza
*Assistant Examiner* — Thinh Tran

(57) ABSTRACT

Ethernet-based networks for routing Internet Protocol (IP) traffic between source and destination sites. One embodiment includes a plurality of discrete data transmission backbones between the source and destination sites. The source site includes control means for distributing IP traffic at the source site to the plurality of backbones for transmission to the destination site.

14 Claims, 4 Drawing Sheets

(56) References Cited

U.S. PATENT DOCUMENTS

| | | | |
|---|---|---|---|
| 6,600,741 B1* | 7/2003 | Chrin et al. | 370/375 |
| 6,665,273 B1* | 12/2003 | Goguen et al. | 370/252 |
| 6,781,984 B1 | 8/2004 | Adam et al. | |
| 6,981,055 B1* | 12/2005 | Ahuja et al. | 709/238 |
| 6,982,974 B1* | 1/2006 | Saleh et al. | 370/386 |
| 7,020,087 B2 | 3/2006 | Steinberg et al. | |
| 7,027,396 B1 | 4/2006 | Golan | |
| 7,106,729 B1* | 9/2006 | Gullicksen et al. | 370/388 |
| 7,307,948 B2* | 12/2007 | Infante et al. | 370/225 |
| 7,342,922 B1* | 3/2008 | Vanesko | 370/380 |
| 7,424,010 B2* | 9/2008 | Konda | 370/388 |
| 7,436,838 B2 | 10/2008 | Filsfils et al. | |
| 7,554,930 B2 | 6/2009 | Gaddis et al. | |
| 7,596,135 B1* | 9/2009 | Iovine et al. | 370/388 |
| 7,626,936 B1 | 12/2009 | Golan et al. | |
| 2002/0184393 A1* | 12/2002 | Leddy et al. | 709/250 |
| 2003/0058880 A1 | 3/2003 | Sarkinen et al. | |
| 2003/0179759 A1 | 9/2003 | Wang | |
| 2004/0008674 A1* | 1/2004 | Dubois | 370/388 |
| 2004/0105456 A1* | 6/2004 | Lanzone et al. | 370/429 |
| 2004/0136385 A1 | 7/2004 | Xue et al. | |
| 2004/0264448 A1 | 12/2004 | Wise et al. | |
| 2005/0002334 A1* | 1/2005 | Chao et al. | 370/230 |
| 2005/0050243 A1 | 3/2005 | Clark | |
| 2005/0063395 A1 | 3/2005 | Smith et al. | |
| 2005/0068960 A1 | 3/2005 | Green et al. | |
| 2005/0111465 A1 | 5/2005 | Stewart | |
| 2005/0135405 A1* | 6/2005 | Galand et al. | 370/442 |
| 2005/0152305 A1 | 7/2005 | Ji et al. | |
| 2005/0201302 A1 | 9/2005 | Gaddis | |
| 2005/0220096 A1 | 10/2005 | Friskney | |
| 2005/0254527 A1* | 11/2005 | Jakel et al. | 370/539 |
| 2006/0008273 A1 | 1/2006 | Xue et al. | |
| 2006/0074618 A1 | 4/2006 | Miller et al. | |
| 2006/0104281 A1* | 5/2006 | Scarr et al. | 370/395.1 |
| 2006/0140136 A1 | 6/2006 | Filsfils et al. | |
| 2006/0153067 A1 | 7/2006 | Vasseur et al. | |
| 2006/0153200 A1 | 7/2006 | Filsfils et al. | |
| 2006/0165087 A1* | 7/2006 | Page et al. | 370/395.3 |
| 2006/0200579 A1 | 9/2006 | Vasseur | |
| 2006/0209687 A1 | 9/2006 | Yagawa et al. | |
| 2006/0209816 A1* | 9/2006 | Li et al. | 370/386 |
| 2006/0215672 A1 | 9/2006 | Lawrence et al. | |
| 2007/0064688 A1* | 3/2007 | Prettegiani | 370/386 |
| 2007/0086429 A1 | 4/2007 | Lawrence et al. | |
| 2008/0151863 A1 | 6/2008 | Lawrence et al. | |
| 2008/0212472 A1* | 9/2008 | Musacchio et al. | 370/232 |
| 2008/0316914 A1* | 12/2008 | Vercellone et al. | 370/216 |
| 2008/0320166 A1 | 12/2008 | Filsfils et al. | |
| 2009/0141632 A1 | 6/2009 | Lawrence et al. | |

FOREIGN PATENT DOCUMENTS

| | | |
|---|---|---|
| JP | 2004/350078 | 12/2004 |
| WO | 0217110 A1 | 2/2002 |
| WO | WO 02/15017 A1 | 2/2002 |
| WO | WO 02/17110 A1 | 2/2002 |
| WO | WO 2006/084071 A2 | 8/2006 |

OTHER PUBLICATIONS

International Searching Authority, U.S. Patent and Trademark Office and Receiving Office, Written Opinion of the International Searching Authority (Form PCT/ISA/237) for international application No. PCT/US07/61629 Feb. 26, 2008, 8 pages.

International Searching Authority, U.S. Patent and Trademark Office and Receiving Office, International Search Report (Form PCT/ISA/210) for international application No. PCT/US07/85977, Apr. 30, 2008, 3 pages.

International Searching Authority, U.S. Patent and Trademark Office and Receiving Office, Written Opinion of the International Searching Authority (Form PCT/ISA/237) for international application No. PCT/US07/85977, Apr. 30, 2008, 4 pages.

Cisco Systems, Inc., Cisco IOS Software Releases 12.1T, Virtual Switch Interface Master MIB Feature Guide, 9 pages, retrieved Aug. 27, 2007 from URL: <http://www.cisco.com/en/US/products/sw/iosswrel/ps1834/products_feature_guide09186a.

Cisco Systems, Inc., Cisco Packet Telephone Center Virtual Switch Version 3.1 Data Sheet, 7 pages, retrieved Aug. 27, 2007 from URL: <http://www.cisco.com/en/US/products/sw/netmgtsw/ps2025/products_data_sheet09186a00.

Cisco Systems, Inc., Cisco MGX 8800 Series Switches, Cisco Virtual Switch Architecture (white paper), 5 pages, retrieved from URL: <http://www.cisco.com/en/US/products/hw/switches/ps1938/products_white_paper09186a0.

Written Opinion of the International Searching Authority (Form PCT/ISA/237), prepared by U.S. Patent and Trademark Office as International Searching Authority for International Application No. PCT/US06/03740, Jul. 27, 2007, 4 pages.

International Search Report (Form PCT/ISA/210), prepared by U.S. Patent and Trademark Office as International Searching Authority for International Application No. PCT/US06/03740, Jul. 27, 2007, 2 pages.

European Search Report, The Hague, EPP290990, Mar. 2, 2006, Jul. 22, 2009, 6 pages.

McDermott, Tom and Brewer, Tony, "Large-scale IP router using a high-speed optical switch element [invited]", Journal of Optical Networking, vol. 2, Issue 7, Jun. 2003-06) XP 008108607, pp. 229-240.

Smiljanic A., "Load balancing mechanisms in close packet switches", Communications, 2004 IEEE International Conference on Paris France, Jun. 20-24, 2004, Piscataway NJ, USA, IEEE, vol. 4, Jun. 20, 2004, XP010712226, isbn 978-0-7803-8533-7, pp. 2251-2255.

Non-Final Office Action mailed Apr. 3, 2009, U.S. Appl. No. 11/565,563, filed Nov. 30, 2006, Applicant Joseph Lawrence, 35 pages.

"Canadian Examination Report dated Mar. 4, 2011", CA Appl. No. 2655984, 3 pgs.

"Japanese Office Action, dated Mar. 22, 2011", JP Appl. No. 2007/554219, 6 pgs.

Morisita, Isao "What is the Truth of Gigabit Ethernet Now?", *Computer & Network Lan* vol. 16, No. 8 Aug. 1, 1998 , 81-92.

Tsuchihashi, N. "Tips when mere sight of Spec List helps you in distinguishing good or bad products, Manual for introduction of custom switch and router, Don't you choose a product in view of only its bland image and price?", *Network World* vol. 9, No. 1 Jan. 1, 2004 , 44-50.

"Chinese Office Action dated Jan. 18, 2011,", counterpart CN application No. 200680003986.1, filed Feb. 3, 2006, , 11 pgs.

"European Examination Report dated Feb. 7, 2011,", counterpart EP application No. 07710455.2, , 4 pgs.

Canadian Office Action dated Sep. 21, 2010, counterpart application No. 2,595,788, originally filed Feb. 3, 2006, Ethernet-Based Systems and Methods for Improved Network Routing, 2 pages.

Claims 1-16 as filed in Canadian Counterpart Patent Application No. 2,595,788, filed Feb. 3, 2006, Ethernet-Based Systems and Methods for Improved Network Routing, pp. 8, 9 and 10.

Canadian Office Action dated May 28, 2010, counterpart application No. 2,657,111 , originally filed Feb. 5, 2007, Systems and Methods for Network Routing in a Multiple Backbone Network Architecture, 5 pages.

Chinese Office Action dated Dec. 22, 2010, counterpart application No. 200780025193.4 originally filed Feb. 5, 2007, Systems and Methods for Network Routing in a Multiple Backbone Network Architecture, 5 pages.

European Search Report dated Apr. 16, 2010, counterpart EP application No. 07710455.2, Systems and Methods for Network Routing in a Multiple Backbone Architecture, 11 pages.

European Examination Report dated Jul. 15, 2010, counterpart EP application No. 07710455.2, Systems and Methods for Network Routing in a Multiple Backbone Architecture, 7 pages.

European Search Report dated Jul. 30, 2009, counterpart EP application No. 06720175.9, Ethernet-Based Systems and Methods for Improved Network Routing, 6 pages.

European Examination Report dated Dec. 9, 2009, counterpart EP application No. 06720174.9, Referring to European Search Report of Jul. 30, 2009, Ethernet-Based Systems and Methods for Improved Network Routing, 1 page.

European Extended Search Report, counterpart EP application No. 07864928.2, System and Method for Switching Traffic Through a Network, Date of Report, Nov. 22, 2010, 3 pages.

European Written Opinion, counterpart EP application No. 07864928.2, System and Method for Switching Traffic Through a Network, Date of Report, Nov. 22, 2010, 4 pages.

Japanese Office Action dated May 11, 2010, counterpart JP application No. 2007-554219, Ethernet-Based Systems and Methods for Improved Network Routing, 4 pages.

US Office Action dated Oct. 8, 2010, counterpart U.S. Appl. No. 11/565,563, Systems and Methods for Network Routing in a Multiple Backbone Network Architecture, 17 pages.

Aleksandra Smiljanic, Load Balancing Mechanisms in Clos Packet Switches, IEEE Communications Society, 2004 IEEE, pp. 2251-2255.

Paul Walker, Interface for home network, IEEE 1355, Nikei Electronics, vol. 589, May 19, 1997, pp. 71-183.

Tom McDermott and Tony Brewer, Large-Scale IP Router Using a High-Speed Optical Switch Element [Invited], Journal of Optical Networking, 2003 Optical Society of America, Jul. 2003, vol. 2, No. 7, pp. 229-240.

Y. Rekhter and T. Li, A Border Gateway Protocol 4 (BGP-4), T. J. Watson Research Center, IBM Corp.,, Cisco Systems Editors, Mar. 1995, 58 pages.

"European Exam Report, dated May 2, 2011", EP App. No. 06720174.9, , 6 pgs.

Nenov, G. "Transporting Ethernet services in metropolitan area networks", *Networks, 2004. (ICON 2004). Proceedings. 12th IEEE International Conference on Singapore* Nov. 16-19, 2004 , 53-59 pgs.

Nitzberg, B. "The P-Mesh—a commodity-based scalable network architecture for clusters", *Systems Sciences, 1999. HICSS-32. Proceedings of the 32nd Annual Hawai i International Conference on Maui, HI, USA* Jan. 5, 1999 , 10 pgs.

"Canadian Examination Report dated Jul. 28, 2011,", Application No. 2,595,788, filed Feb. 3, 2006, 2 pgs.

"Chinese Exam Report, dated Apr. 26, 2011", App. No. 200780025093.1, 20 pgs.

Canadian Examination Report, dated May 8, 2013, Application No. 2,657,111, 2 pgs.

Chinese Examination Report, dated Sep. 14, 2012, Application No. 200780025193.4, 2 pgs.

Chinese Examination Report, dated Mar. 20, 2013, Application No. 200780025093.1, 5 pgs.

Canadian Office Action, dated Mar. 19, 2012, Application No. 2,657,111, 3 pgs.

Canadian Office Action, dated Mar. 21, 2012, Application No. 2,595,788, 2 pgs.

U.S. Appl. No. 13/601,806, filed Aug. 31, 2012, "Systems and Methods for Network Routing in a Multiple Backbone Network Architecture,", 41 pgs.

Chinese Examination Report dated Apr. 27, 2012, CN Appl. No. 200780025093.1, 4 pgs.

Extended European Search Report, dated Jun. 18, 2013, Application No. 12177337.8, 6 pgs.

* cited by examiner

ETHERNET-BASED SYSTEMS AND METHODS FOR IMPROVED NETWORK ROUTING

REFERENCE TO RELATED APPLICATION

This application claims the benefit of U.S. Provisional Application Ser. No. 60/650,312, filed Feb. 4, 2005, and entitled Systems And Methods For Improved Network Routing, which is incorporated herein in its entirety.

FIELD OF THE INVENTION

The present invention relates generally to network routing, and more specifically to Ethernet-based systems and methods for routing IP traffic at the edges and in the core backbone of an IP (Internet Protocol) network.

BACKGROUND OF THE INVENTION

High speed internet prices continue to drop, but the underlying costs of maintaining and operating the networks remain relatively high. One of the main factors in keeping the unit costs high is the high cost for the terabit MPLS backbone routers. Accordingly, as bandwidth requirements grow, the costs will likely grow as well. Thus, a need exists for ways to scale network architectures larger (i.e., higher bandwidth capacity) in a more cost effective manner.

DETAILED DESCRIPTION OF THE PREFERRED EMBODIMENTS

One way to scale these networks larger at lower costs is to use a network or matrix of Ethernet switches to perform the functions currently being performed by expensive routers. These Ethernet switch matrices can be used in place of the terabit MPLS backbone routers, as well as in place of gigabit access routers at the edge of a network backbone. By using the Ethernet switch matrices, unit costs can be lowered.

While cost is a concern, scalability (i.e., the ability to grow with bandwidth demands) is also a concern when designing and implementing new systems. In fact, some forecasters are estimating a significant demand growth. Thus, the ability to scale the network at reasonable costs will be very important.

Three systems have been developed to address these issues. These systems can be used individually or together to form a cost effective, scalable core backbone network and/or edge network. The systems include a multi-chassis Ethernet router ("MER"), a multiple parallel backbone configuration ("N× BB"), and a LAN in the middle ("LIM") configuration.

Multi-Chassis Ethernet Router (MER)

In one embodiment, the MER will comprise a multi-stage CLOS matrix (e.g., 3 stages) router built out of Ethernet switches. The MER will use IP protocols to distribute traffic load across multiple switch stages. This design leverages existing technology, but allows scalability by adding additional Ethernet switches, additional stages, a combination or both, or new, inexpensive MERs.

Figure 1:
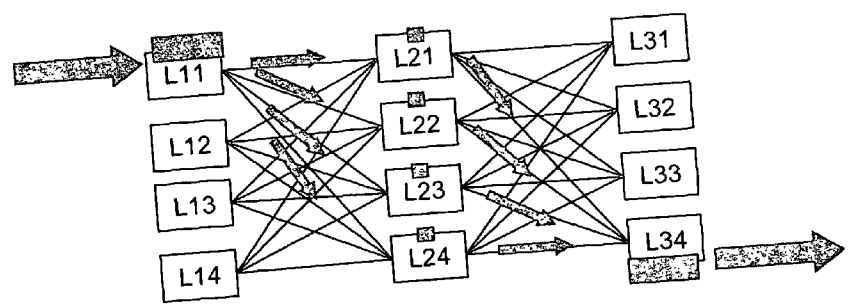
FIG. 1 is a diagrammatic illustration of a three-stage multichassis Ethernet router (MER) in accordance with one embodiment of the invention.

FIG. 1 is a diagrammatic illustration of one embodiment of a 3-stage MER in accordance with one embodiment of the invention. In this particular embodiment, the MER utilizes 4 Ethernet switches in each of the three stages. Again, additional switches or stages can be added. In this particular example, as illustrated by the arrows in FIG. 1, traffic destined out L34 arrives at L11. L11 equally distributes the traffic across L21-L24 using one or more load balancing or distribution methods. L21-L24 forwards traffic to L34, which combines the flows and forwards them out the necessary links. This design provides a dramatic increase in scale. For example, in the illustrated embodiment, a 4×MER provides a 4× increase in node size. The maximum increase for a 3 stage fabric is $n^2/2$, where n is the number of switches used in each stage. Five stage and seven stage matrices will further increase scalability.

While CLOS matrices are known, CLOS matrices have not been implemented in a network of Ethernet switches, which is what this particular implementation provides. Further, the CLOS matrices typically implemented in the very expensive MPLS routers are implemented using proprietary software and are encompassed into a single box. In this particular implementation, multiple inexpensive Ethernet switches are formed into the matrix, and the CLOS distribution is implemented using IP protocols, not a proprietary software. Further, in this particular implementation, the CLOS matrix is implemented at each hop of the switches, instead of in a single device. Other protocols can be used in other embodiments.

After the Ethernet switches are connected together, the packets and/or packet cells can be distributed to the different stages of the matrix using flow based load balancing. Internal gateway protocols ("IGP") can be used to implement the load balancing techniques. In some embodiments, the MER can utilize equal cost load balancing, so that each third-stage box (i.e., L31, L32, L33 and L34) associated with a destination receives the same amount of traffic. For example, if boxes L1, L2 and L3 all communicate with New York, each box will receive the same amount of traffic. This technique is relatively easy to implement and scales well, when new MERs are implemented.

In another embodiment, traffic on the MER can be distributed using bandwidth aware load balancing techniques, such as traffic engineering techniques (e.g., MPLS traffic engineering) that send packets to the least busy switch. In one embodiment, the middle layer can run the traffic engineering functionality, thus making intelligent routing decisions.

In yet another embodiment, traffic awareness techniques in the middle layer (i.e., L21, L22, L23, and L24) can be used to determine what the downstream traffic requirements might be. That is, the middle layer can determine demand placed on the third or last layer and then determine routing based on the capacity needs. In this embodiment, the middle layer can receive demand or capacity information from the last (e.g., third) layer via traffic engineering tunnels (e.g., MPLS tunnels) or via layer 2 VLANS. Alternatively, changes to IGP can be leveraged to communicate bandwidth information to the middle layer. For example, switch L31 can communicate to the middle layer (e.g., via IGP or other protocols) that it is connected to New York with 30 Gb of traffic. The middle layer can use this protocol information, as well as information from the other switches, to load balance the MER.

In another embodiment, an implementation of the MER can use a control box or a route reflector to manage the MER. In some embodiments, the route reflector or control box can participate in or control routing protocols, keep routing statistics, trouble shoot problems with the MER, scale routing protocols, or the like. In one embodiment the route reflector can implement the routing protocols. So, instead of a third stage in a MER talking to a third stage in another MER, a route reflector associated with a MER could talk to a route reflector associated with the other MER to determine routing needs and protocols. The route reflector could utilize border gateway protocols ("BGP") or IGP route reflection protocols could be used (e.g., the route reflector could act as an area border router).

Multiple Parallel Backbones (N×BB)

Figure 2:
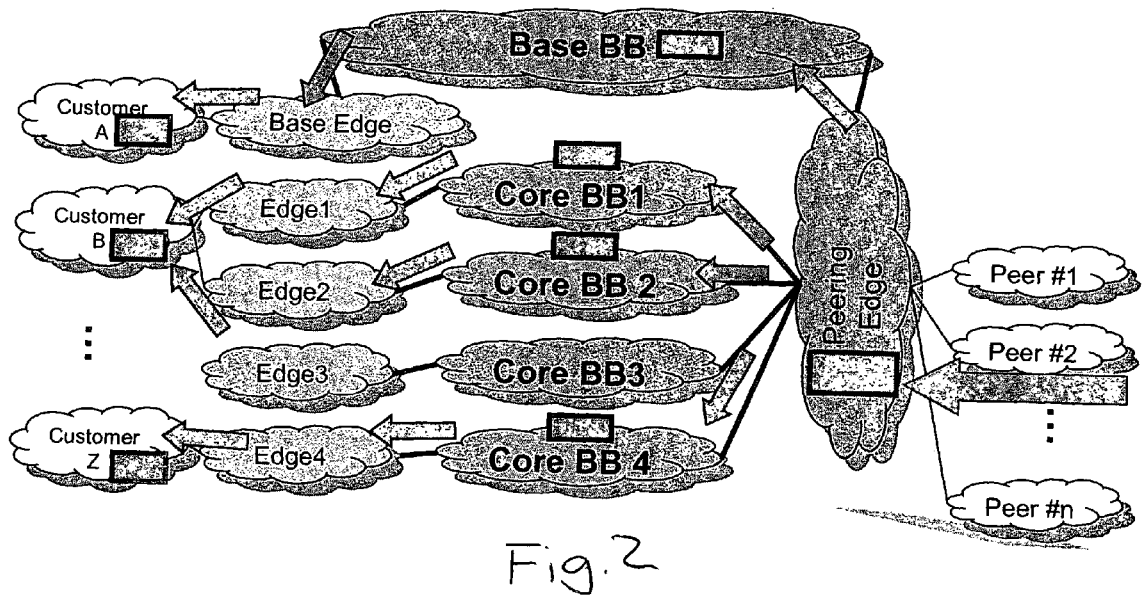
FIG. 2 is a diagrammatic illustration of multiple parallel backbones (N×BB) connected to peer and edge networks in accordance with another embodiment of the invention.

Another implementation that can be utilized to scale a core backbone network is to create multiple parallel backbones. One embodiment of this type of implementation is illustrated in FIG. 2. With the N×BB configuration, traffic can be split across multiple backbones to increase scale.

As illustrated in FIG. 2, one embodiment of an implementation deploys a series of parallel backbones between core sites. The backbones can use large MPLS routers, Ethernet switches, the MERs discussed above, or any other suitable routing technology. In addition, in the illustrated embodiment, peers can connect to the backbones through a common peering infrastructure or edge connected to each backbone, and customers can connect to specific backbone edges. That is, peers are connected to the parallel backbones (BB, BB1, BB2, BB3 and BB4) through a single peering edge, and customers are connected to the backbones through separate edge networks. In FIG. 2, each backbone has is own customer edge network. In alternative embodiments, however, only one or just a couple of edge network might be utilized (similar to one peering edge). The edge network also can use different routing technologies, including the MERs discussed above. The use of MERs can help with scaling of the peering edge.

The arrows in FIG. 2 illustrate an example of traffic flows in a parallel backbone network. In this example, traffic destined for customers A-Z arrives from Peer #2. The peering edge splits traffic across the multiple backbones based on the final destination of the traffic (e.g., peering edge can distribute traffic based on IP destination prefix). Then each of the backbones forwards traffic through its associated customer edge to the final customer destination.

This multiple parallel backbone network can have many advantages. For example, parallel backbones make switching needs smaller in each backbone, so Ethernet switches and/or MERs can be used. In addition, the parallel backbone configuration can leverage existing routing and control protocols, such as BGP tools like traffic engineering, confederations, MBGP, and the like. The use of the traffic engineering protocols can help steer traffic to the appropriate backbone(s). Further, with the existence of multiple backbones, fault tolerant back-up systems can be created for mission critical applications. That is, one or more backbones can be used for disaster recovery and/or back-up purposes. Further, in yet other embodiments, the parallel backbone can be organized and utilized based on different factors. For example, a peer could have one or more backbones dedicated to it. Similarly, a customer could have one or more backbones dedicated to it. In yet other embodiments, customers can be allocated across backbones based on traffic and/or services. For example, Voice Over IP (VoIP) might use one or more backbones, while other IP service might use other backbones. Thus, backbones can be provisioned by peer, customer, service, traffic volume or any other suitable provisioning parameter.

Figure 3:
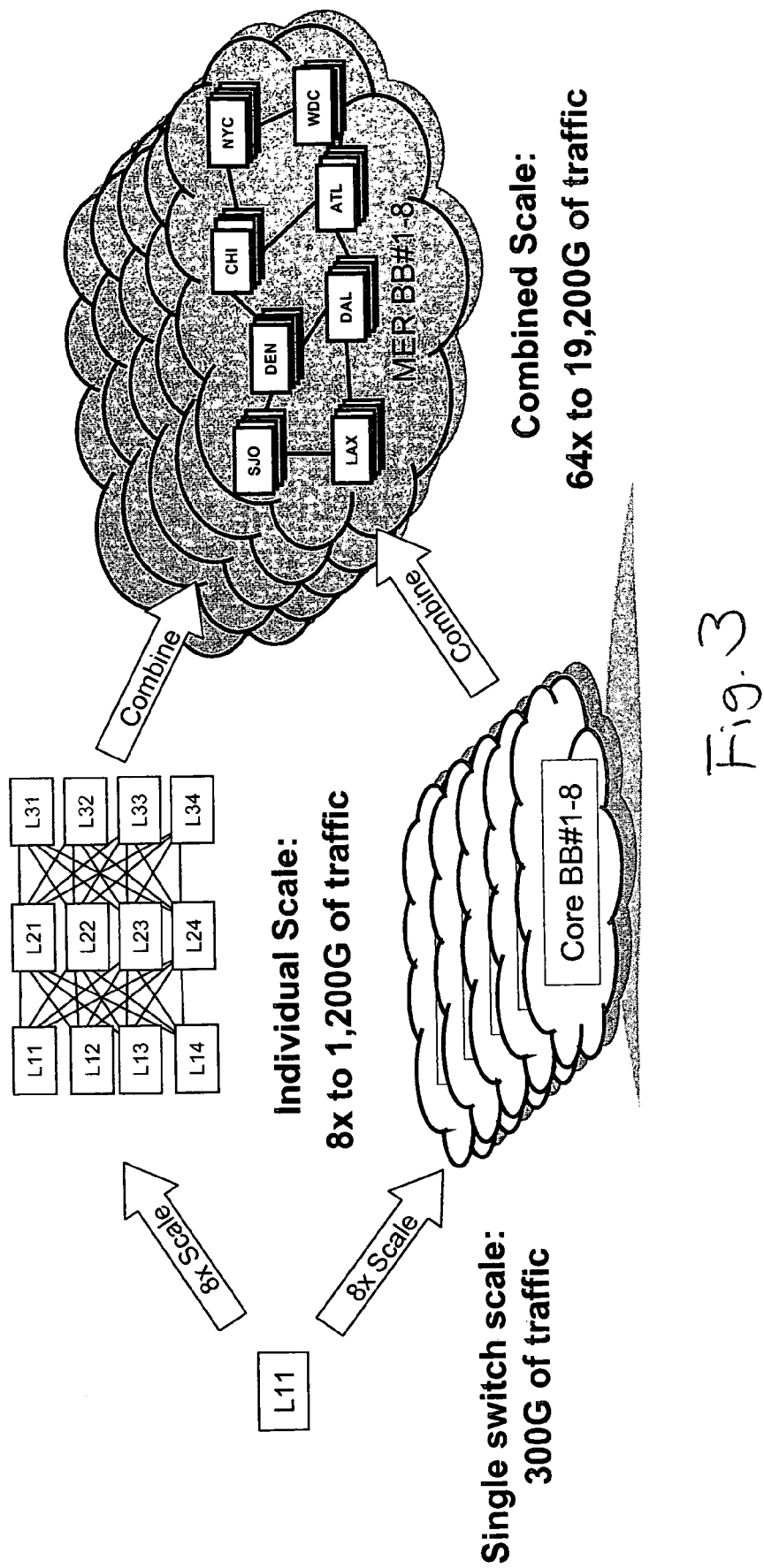
FIG. 3 is a diagrammatic illustration of a combination of the multichassis Ethernet router shown in FIG. 1 and the multiple parallel backbones shown in FIG. 2 connected between sites in accordance with another embodiment of the invention.

Further, as illustrated in FIG. 3, a combination of multi-chassis Ethernet routers (MER) and parallel backbones (N×BB) can be used for even greater scaling. For example, as illustrated in the example in FIG. 3, a 300 G Ethernet switch capacity could be increased 64× to 19,200 G using a combination of MER and parallel backbones. In this example, an 8×MER and an 8× parallel backbone is combined to get 64× scalability. Scalability can be even larger if larger MERs (e.g., 16× or 32×) and/or more parallel backbones are used. Thus, these technologies used alone and/or together can help scale capacity greatly.

Figure 4:
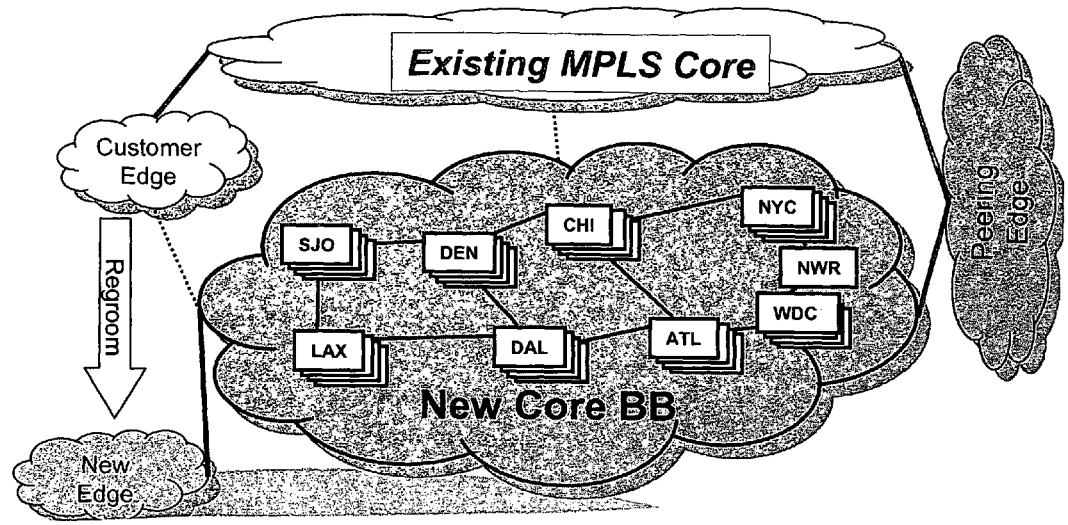
FIG. 4 is a diagrammatic illustration of a multichassis Ethernet router-based core in parallel with existing MPLS cores between sites in accordance with another embodiment of the invention.

Further, as illustrated in FIG. 4, an Ethernet-based core (e.g., a core based on MERs) can be added as a parallel core to existing MPLS cores, thus adding easy scalability at a reasonable price without having to replace existing cores. In this implementation, some existing customers as well as new customers could be routed to the new Ethernet-core backbone. Alternatively, specific services, such as VoIP could be put on the new backbone, while leaving other services on the MPLS. Many different scenarios of use of the two cores could be contemplated and used.

Figure 5:
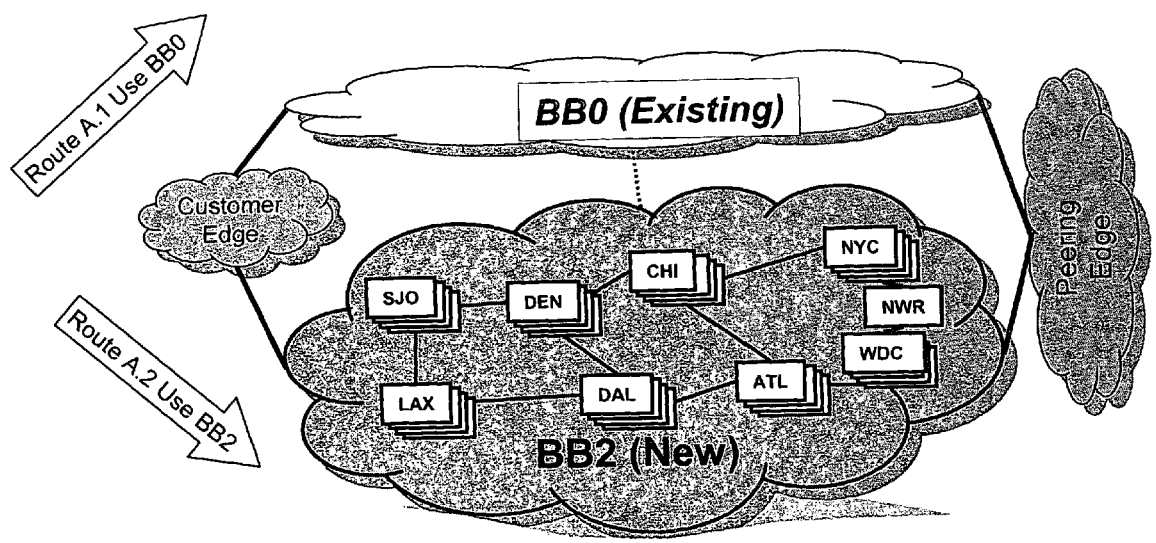
FIG. 5 is a diagrammatic illustration of an alternative version of the invention shown in FIG. 4.

FIG. 5 is another illustration of the Ethernet-based parallel core in parallel with an existing MPLS core. BGP techniques can be used to select which backbone to use on a per destination basis. Candidate routes are marked with a BGP community string (and IP next hop) that forces all traffic to the destination address to the second backbone. The selection can be done on a route by route basis and could vary based on source. Alternatively, a customer-based global policy can be used so that all traffic exiting a specific set of customer parts would use the same backbone. Route selection and route maps can be automatically generated by capacity planning tools.

LAN in the Middle (LIM)

Figure 6:
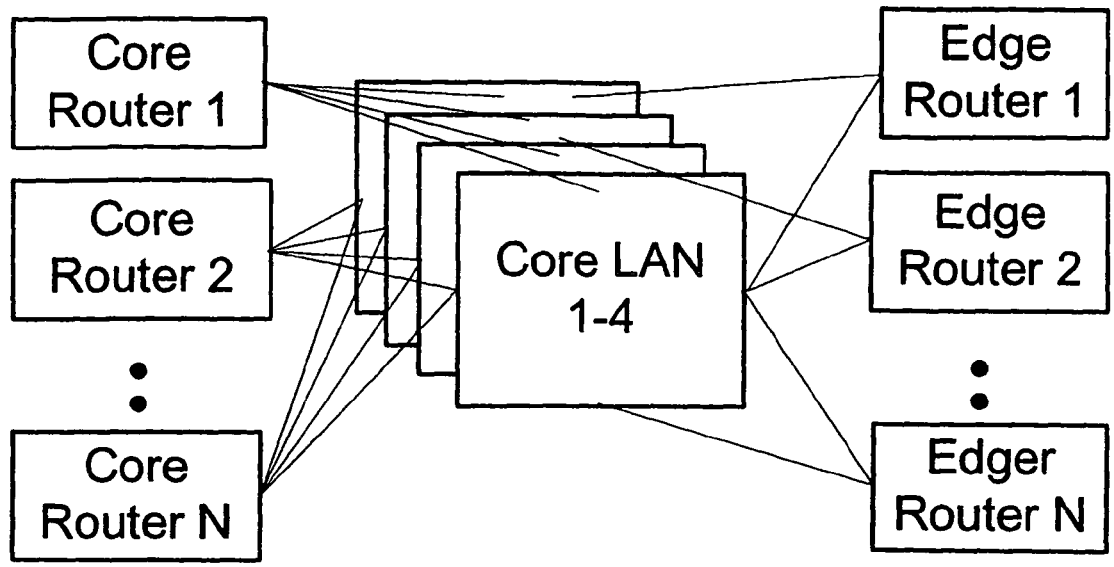
FIG. 6 is a diagrammatic illustration of multiple core local area networks connected in the middle of core routers and edge routers in accordance with another embodiment of the invention.

Another network implementation that could used to scale backbone cores is the LIM. One embodiment of a LIM is illustrated in FIG. 6. In the illustrated embodiment, core routers are connected to edge routers through Ethernet switches. This is a similar configuration to the MERs discussed above, except existing core routers and edge routers are used in stages 1 and 3, instead of all stages using Ethernet switches. The benefit of this configuration is that the existing routers can be scaled larger without having to replace them with Ethernet switches. Using Ethernet switches in the middle layer and using CLOS matrices, as discussed above, will increase capacity of the existing core and edge routers. In one embodiment, the core and edge routers will be responsible for provisioning the traffic through the matrix.

Figure 7:
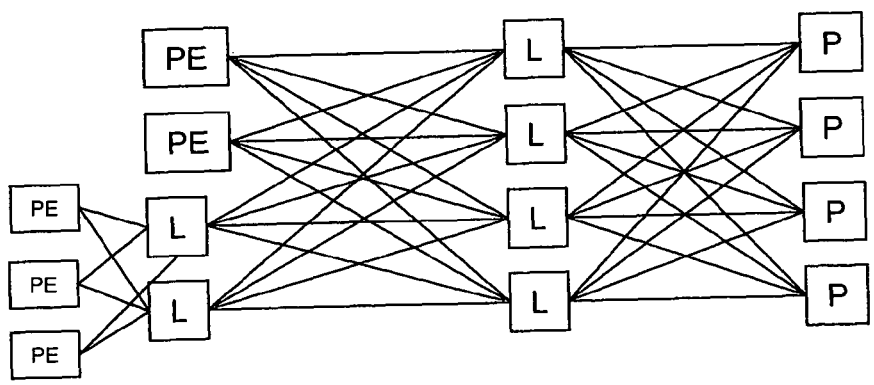
FIG. 7 is a diagrammatic illustration of an alternative LIM.

FIG. 7 is a diagrammatic illustration of an alternative LIM. Customer facing provider edges (PE) can, for example, have 4×10 G to the LIM. With a 1+1 protection, this would allow 20 G customer facing working traffic. On the WAN facing side, each provider or core router (P) has 4×10 G to the LIM. With 1+1 protection, this allows at least 20 G of WAN traffic.

Although the present invention has been described with reference to preferred embodiments, those skilled in the art will recognize that changes can be made in form and detail without departing from the spirit and scope of the invention.

What is claimed is:

1. A network system for routing Internet Protocol (IP) traffic between a source site and a destination site, comprising:
a plurality of discrete data transmission backbones between the source and destination sites;
wherein the source site comprises a first Clos matrix of switches configured to selectively distribute IP traffic across the plurality of discrete data transmission backbones for transmission to the destination site and to perform routing control functions for a peering edge common to each discrete data transmission backbone;
wherein the destination site comprises a second Clos matrix of switches configured to selectively distribute IP traffic received over the plurality of discrete data transmission backbones and to perform routing control functions for a plurality of peering edges, wherein each peering edge is in communication with the network via a single discrete data transmission backbone;
wherein one of the plurality of discrete transmission backbones includes an N×M IP-implemented Clos matrix of Ethernet switches, wherein N>2 is the number of stages in the matrix and M>1 is the number of switches in each stage, and wherein the M switches of the first and last stages are Multi-Protocol Label Switching (MPLS) switches and the M switches of at least one stage between the first and last stages are Ethernet switches; and
a load balancing process for balancing the flow of traffic between two or more switches of each of the stages of the N×M Clos matrix.

2. The network system of claim 1 wherein the first Clos matrix of switches distributes IP traffic as a function of traffic volume on the plurality of backbones.

3. The network system of claim 1 wherein the first Clos matrix of switches distributes IP traffic as a function of the nature or type of the IP traffic.

4. The network system of claim 1 further comprising internal gateway protocol (IGP) for balancing traffic in the N×M Clos matrix.

5. The network system of claim 1 further comprising an equal cost-based load balancing process for balancing traffic across each switch of a final stage associated with a common destination.

6. The network system of claim 1 further comprising a route reflector coupled to the matrix of switches, wherein the route reflector is configured for managing functionality of the N×M Clos matrix.

7. The network system of claim 6, wherein the route reflector performs at least one of: maintenance of routing statistics, troubleshooting of the N×M Clos matrix, and scaling of routing protocols for the N×M Clos matrix.

8. The network system of claim 1, wherein the first Clos matrix of switches is configured to determine which of the plurality of discrete data transmission backbones to route traffic over based on use of Border Gateway Protocol (BGP), wherein BGP community strings indicate which candidate routes should be used for inducing transmission of the IP traffic from the source site to the destination site.

9. A system for routing Internet Protocol (IP) traffic across a network to an edge node of the network, wherein the network comprises at least a first backbone network, the system comprising:
an N×M IP-implemented Clos matrix of switches, wherein:
N>2 is the number of stages in the matrix;
M>1 is the number or switches in each stage;
the M switches of the first and last stages are Multi-Protocol Label Switching (MPLS) switches; and
the M switches of at least one stage between the first and last stages are Ethernet switches; and
wherein the N×M Clos matrix of switches is configured with a routing protocol control process for distributing IP traffic between the switches:
a second backbone network comprising a Clos matrix of switches in parallel with the first backbone; and
wherein the routing control process is operable to selectively distribute the IP traffic across the second backbone and the first backbone in order to route the IP traffic to the edge node based on use of Border Gateway Protocol (BGP), wherein BGP community strings indicate which candidate routes should be used for inducing transmission of the IP traffic from the source site to the destination site.

10. The system of claim 9 further comprising a load balancing process for balancing the flow of traffic between two or more switches of each of one or more stages of the N×M Clos matrix.

11. The system of claim 9 further comprising internal gateway protocol (IGP) for balancing traffic in the N×M Clos matrix.

12. The system of claim 9 further comprising an equal cost-based load balancing process for balancing traffic by causing each switch of a final stage of the N×M Clos matrix associated with a common destination to receive about the same amount of traffic.

13. The system of claim 9 further comprising a route reflector coupled to the matrix of switches, wherein the route reflector manages routing functionality of the N×M Clos matrix; and
wherein the route reflector further performs at least one of: maintenance of routing statistics, troubleshooting of the N×M Clos matrix, and scaling of routing protocols for the N×M Clos matrix.

14. A method for network communications between a source site and a destination site comprising:
routing Internet Protocol (IP) traffic across a plurality of discrete data transmission backbones between the source and destination sites, wherein at least one of the discrete data transmission backbones is dedicated to IP traffic from one or more customer networks associated with the source site;
from the source site, distributing IP traffic among the plurality of discrete data transmission backbones as a function of the one or more customer networks originating the IP traffic;
at the destination site, receiving the IP traffic from the at least one dedicated discrete data transmission backbone transmitting IP traffic originating from the one or more customer networks;
wherein at least one of the discrete data transmission backbones comprises a Clos matrix of Ethernet switches, the Clos matrix comprising a plurality of stages each having a plurality of Ethernet switches;
wherein the source site comprises a first Clos matrix configured to perform routing control functions for a peering edge common to each discrete data transmission backbone; and
wherein the destination site comprises a second Clos matrix of switches configured to perform routing control functions for a plurality of peering edges, wherein each peering edge is in communication with the network via a single discrete data transmission backbone;

wherein one of the plurality of discrete transmission backbones includes an N×M IP-implemented Clos matrix of Ethernet switches, wherein N>2 is the number of stages in the matrix and M>1 is the number of switches in each stage, and wherein the M switches of the first and last stages are Multi-Protocol Label Switching (MPLS) switches and the M switches of at least one stage between the first and last stages are Ethernet switches; and balancing the flow of traffic between two or more switches of each of the stages of the N×M Clos matrix.

* * * * *